United States Patent
Hyuga et al.

(10) Patent No.: US 8,279,478 B2
(45) Date of Patent: Oct. 2, 2012

(54) PRINTING SYSTEM, PRINTING APPARATUS AND IMAGE-PRINTING METHOD FOR SUPPRESSING IMAGE QUALITY DEGRADATION

(75) Inventors: Takashi Hyuga, Suwa (JP); Kenji Murakami, Suwa (JP); Iwane Ikeda, Suwa (JP); Kimitake Mizobe, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 297 days.

(21) Appl. No.: 12/643,709

(22) Filed: Dec. 21, 2009

(65) Prior Publication Data

US 2010/0165394 A1  Jul. 1, 2010

(30) Foreign Application Priority Data

Dec. 26, 2008 (JP) ................................ 2008-332793
Sep. 9, 2009 (JP) ................................ 2009-207790

(51) Int. Cl.
G06F 3/12 (2006.01)
(52) U.S. Cl. ........ 358/1.15; 382/166; 382/167; 382/274
(58) Field of Classification Search .......... 358/1.1–3.23; 715/200–277; 382/162–167, 232–275
See application file for complete search history.

(56) References Cited

U.S. PATENT DOCUMENTS

| 2006/0274332 A1* | 12/2006 | Miyagi | ........................ 358/1.2 |
| 2007/0201754 A1* | 8/2007 | Li | .................................. 382/240 |
| 2011/0110562 A1* | 5/2011 | Kelle et al. | .................... 382/110 |

FOREIGN PATENT DOCUMENTS

JP   2002-176552 A   6/2002

* cited by examiner

Primary Examiner — Benny Q Tieu
Assistant Examiner — Marcellus Augustin
(74) Attorney, Agent, or Firm — Kilpatrick Townsend & Stockton LLP

(57) ABSTRACT

A printing system that transfers an image composed of pixels of a first resolution, includes a client and a printing apparatus. The client includes a determining unit that, for a pixel block that is of a size of a pixel of a second resolution that is lower than the first resolution, determines whether or not the pixel block is homogenous on the basis of a difference in color information for a target pixel of the first resolution included in the pixel block; an image-data-for-transfer creating unit that creates image data for transfer by changing pixels of the first resolution included in a pixel block that has been determined to be homogenous from the first resolution to the second resolution; and a transmitting unit that transmits the image data for transfer. The printing apparatus includes a receiving unit that receives the image data for transfer and a high-resolution-image-data creating unit that creates image data representing an image composed of pixels of the first resolution by changing pixels of the second resolution in the image data for transfer from the second resolution to the first resolution.

8 Claims, 13 Drawing Sheets

FIG. 7
TARGET PIXEL
| g1 | g2 | g3 | g4 |
| g5 | g6 | g7 | g8 |
| g9 | g10 | g11 | g12 |
| g13 | g14 | g15 | g16 |
| g1 | g2 | g3 | g4 |   Bm
| g5 | g6 | g7 | g8 |
| g9 | g10 | g11 | g12 |
| g13 | g14 | g15 | g16 |
(DIFFERENCE = 0)
TARGET PIXEL
TARGET PIXEL
| g1 | g2 | g3 | g4 |   Bn
| g5 | g6 | g7 | g8 |
| g9 | g10 | g11 | g12 |
| g13 | g14 | g15 | g16 |
(DIFFERENCE > 0)
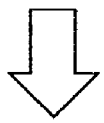
(HOMOGENOUS)
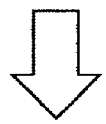
(INHOMOGENOUS)

RELATED ART CONFIGURATION

PRINTING SYSTEM, PRINTING APPARATUS AND IMAGE-PRINTING METHOD FOR SUPPRESSING IMAGE QUALITY DEGRADATION

This application claims priority to Japanese Patent Application No. 2008-332793, filed Dec. 26, 2008 and Japanese Patent Application No. 2009-207790, filed Sep. 9, 2009 the disclosures of which are incorporated by reference herein.

BACKGROUND

1. Technical Field

The present invention relates to image-transfer technologies.

2. Related Art

When transferring images having a high resolution between image-processing apparatuses such as printers, personal computers and digital still cameras, the processing load for image transfer is high due to there being a large amount of data to process. Therefore, the amount of data to be transferred is reduced by compressing the image or reducing the resolution of the image, prior to transferring the image. Here, in a case in which, prior to being transferred, the resolution of an image including a text portion and a portion other than the text portion (hereafter, a graphic portion) was evenly reduced, a deterioration in image quality can occur, such as unevenness in the width of lines or tapering in the text portion of the image after the expansion of the image. In response to this, a method has been proposed in which a text portion and a graphic portion of an image are separated, respectively reduced to appropriate resolutions, and then transferred. Then, on the reception side, after increasing the resolutions of the respective portions so that they are made to match, the portions are combined to re-form the image (see, for example, JP-A-2002-176552).

FIG. 13 is an explanatory diagram that schematically illustrates an image-transferring method of the related art. In FIG. 13, an area A within an image F1 is shown in an enlarged manner. On the sending side, the area A is separated into a text portion Pa and a graphic portion Pb, the text portion Pa and the graphic portion Pb are respectively turned into a image f1 having a high-resolution and an image f2 having a low-resolution, and the images f1 and f2 are then transmitted. On the receiving side, after converting the received image f2 to the same resolution as the image f1, a composite image F10 having a high resolution is obtained by combining the image f1 and the image f2. At this time, there has been a problem in that loss of data occurs in areas B corresponding to the boundary between the text portion Pa and the graphic portion Pb in the composite image F10.

A method has also been considered in which, when an image is to be transferred, the amount of data is reduced by reducing the number of bits used to represent the tone of each pixel of the image, without causing the resolution of the image to be reduced. However, in this case, on the receiving side, the hues of the original image (particularly those of a graphic portion) cannot be faithfully reproduced and the quality of the image is severely deteriorated.

The above-described problems can arise not only in image transfer between different image-processing apparatuses but also in image transfer within a single image-processing apparatus (for example, in image transfer from a unit functioning as a scanner to a unit functioning as a printer within a multifunction apparatus).

SUMMARY

An advantage of some aspects of the invention is that, in image transfer, it reduces the amount of data to be transferred to a low level while suppressing degradation of image quality in terms of the appearance of the image.

Modes of the invention can be implemented in the form of the aspects and embodiments described below.

First Aspect

A printing system that transfers an image composed of pixels of a first resolution, includes a client and a printing apparatus. The client has a determining unit that, for a pixel block that is of a size of a pixel of a second resolution that is lower than the first resolution, determines whether or not the pixel block is homogenous on the basis of a difference in color information for a target pixel of the first resolution included in the pixel block; an image-data-for-transfer creating unit that creates image data for transfer by changing pixels of the first resolution included in a pixel block that has been determined to be homogenous, from the first resolution to the second resolution; and a transmitting unit that transmits the image data for transfer. The printing apparatus has a receiving unit that receives the image data for transfer and a high-resolution-image-data creating unit that, creates image data representing an image composed of pixels of the first resolution by changing pixels of the second resolution in the image data for transfer from the second resolution to the first resolution.

In the printing system according to the first aspect, in the client, since the image data for transfer is created by converting pixel blocks that have been determined to be homogenous to the comparatively low second resolution and is then transmitted to the printing apparatus, the amount of data to be transmitted can be reduced to a low level. Furthermore, since the image data for transfer is created by converting only homogenous pixel blocks to the second resolution while maintaining inhomogenous pixel blocks at the comparatively high first resolution, when the image data is created in the printing apparatus, degradation of the image quality in terms of the appearance of the image can be suppressed. In addition, since processing to divide text and graphic areas into separate images is not performed, loss of data can be suppressed when the image data is created in the printing apparatus.

Second Aspect

The printing system according to the first aspect, wherein, excluding a case where all pixel blocks included in the image are determined to be homogenous by the determining unit and a case where all pixel blocks included in the image are determined to be inhomogenous by the determining unit, the image data for transfer includes color information of pixels of the first resolution and color information of pixels of the second resolution.

According to the printing system of the second aspect, compared to the case in which only color information of pixels of the first resolution is included in the image data for transfer, the amount of image data can be reduced to a low level, since color information of pixels of the second resolution is included in the image data for transfer.

Third Aspect

The printing system according to the first aspect, wherein the image-data-for-transfer creating unit creates the image data for transfer by arranging the color information of individual pixels in an order determined by the determining unit regardless of the presence or absence of changes from the first resolution to the second resolution.

According to the printing system of the third aspect, the processing to create the image data for transfer can be simplified.

Fourth Aspect

The printing system according to the first aspect, wherein in a case where the difference in color information is zero, the determining unit determines that the pixel block is homogenous.

By performing the above determination, whether a pixel block is homogenous or not can be determined with high precision.

Fifth Aspect

The printing system according to the first aspect, wherein the high-resolution-image-data creating unit, when changing pixels of the second resolution from the second resolution to the first resolution, sets pixel values of color information of pixels of the first resolution included in the pixel block of a size of a pixel of the second resolution to the same value.

By setting the pixel values in this manner, the reproducibility of colors can be increased and degradation of image quality in terms of the appearance of the image that arises with creation of the image data for transfer and creation of the image data based on the image data for transfer can be suppressed.

Sixth Aspect

The printing system according to the first aspect, wherein the image data for transfer includes an identifier that identifies a pixel of the first resolution or a pixel of the second resolution.

As a result of the image data for transfer including such an identifier, when the image data is created on the basis of the image data for transfer in the printing apparatus, which of the first resolution and the second resolution, pixels constituting each block are expressed with, can be easily discriminated.

Seventh Aspect

A printing apparatus that internally transfers an image composed of pixels of a first resolution, includes: a determining unit that, for a pixel block that is of a size of a pixel of a second resolution that is lower than the first resolution, determines whether or not the pixel block is homogenous on the basis of a difference in color information for a target pixel of the first resolution included in the pixel block; an image-data-for-transfer creating unit that, creates image data for transfer by changing pixels of the first resolution included in a pixel block that has been determined to be homogenous from the first resolution to the second resolution; a transmitting unit that transmits the image data for transfer; a receiving unit that receives the transmitted image data for transfer; and a high-resolution-image-data creating unit that creates image data representing an image composed of pixels of the first resolution by changing pixels of the second resolution in the received image data for transfer from the second resolution to the first resolution.

In the printing apparatus according to the seventh aspect, since the image data for transfer is created by converting pixel blocks that have been determined to be homogenous to the comparatively low second resolution and is then transmitted, the amount of data to be transferred within the printing apparatus can be reduced to a low level. Furthermore, since the image data for transfer is created by converting only homogenous pixel blocks to the second resolution while maintaining inhomogeneous pixel blocks at the comparatively high first resolution, degradation of the image quality in terms of the appearance of the image can be suppressed when the image data is created in the printing apparatus. In addition, since processing to divide a text area and a graphic area into separate images is not performed, loss of data can be suppressed when the image data is created in the printing apparatus.

Eighth Aspect

An image-printing method for transferring an image composed of pixels a first resolution from a client to a printing apparatus and then printing the image, the image-printing method comprising: (a) determining, in the client, for a pixel block that is of a size of a pixel of a second resolution that is lower than the first resolution, whether or not the pixel block is homogenous on the basis of a difference in color information for a target pixel of the first resolution included in the pixel block; (b) creating, in the client, image data for transfer by changing pixels of the first resolution included in a pixel block that has been determined to be homogenous in (a) from the first resolution to the second resolution; (c) transmitting, in the client, the image data for transfer; (d) receiving, in the printing apparatus, the image data for transfer; (e) creating, in the printing apparatus, image data representing an image composed of pixels of the first resolution by changing pixels of the second resolution in the image data for transfer from the second resolution to the first resolution; and (f) performing printing, in the printing apparatus, on the basis of the image data created in (e).

In the printing method according to the eighth aspect, since, in the client, the image data for transfer is created by converting pixel blocks that have been determined to be homogenous to the comparatively low second resolution, prior to being transmitted to the printing apparatus, the amount of data to be transferred can be reduced to a low level. Furthermore, since the image data for transfer is created by converting only homogenous pixel blocks to the second resolution while maintaining inhomogenous pixel blocks at the comparatively high first resolution, degradation of the image quality in terms of the appearance of the image can be suppressed when creating the image data in the printing apparatus. In addition, since processing to divide a text area and a graphic area into separate images is not performed, loss of data can be suppressed when creating the image data in the printing apparatus.

Ninth Aspect

An image-transferring system includes a data-transmitting apparatus and a data-receiving apparatus and transfers an image composed of pixels of a first resolution. The data-transmitting apparatus includes a determining unit that, for a pixel block that is of a size of a pixel of a second resolution that is lower than the first resolution, determines whether or not the pixel block is homogenous on the basis of a difference in color information for a target pixel of the first resolution included in the pixel block; an image-data-for-transfer creating unit that creates image data for transfer by changing pixels of the first resolution included in a pixel block that has been determined to be homogenous from the first resolution to the second resolution; and a transmitting unit that transmits the image data for transfer. The data-receiving apparatus includes a receiving unit that receives the image data for transfer and a high-resolution-image-data creating unit that creates image data representing an image composed of pixels of the first resolution by changing pixels of the second resolution in the image data for transfer from the second resolution to the first resolution.

In the image-transferring system according to the ninth aspect, in the data-transmitting apparatus, since the image data for transfer is created by converting pixel blocks that have been determined to be homogenous to the comparatively low second resolution prior to being transmitted to the data-receiving apparatus, the amount of data to be transferred can be reduced to a low level. Furthermore, since the image data for transfer is created by converting only homogenous pixel blocks to the second resolution while maintaining inhomogenous pixel blocks at the comparatively high first resolution, when the image data is created in the data-receiving apparatus, degradation of the image quality in terms of the appearance of the image can be suppressed. In addition, since processing to divide a text area and a graphic area into separate images is not performed, loss of data can be suppressed when the image data is created in the data-receiving apparatus.

Tenth Aspect

The image-transferring system according to the ninth aspect, wherein in a case where the difference in color information is zero, the determining unit determines that the pixel block is homogenous.

By performing the above determination, whether or not a pixel block is homogenous can be determined with high precision.

Eleventh Aspect

The image-transferring system according to the ninth aspect, wherein the high-resolution-image-data creating unit, when changing pixels of the second resolution from the second resolution to the first resolution, sets pixel values of color information of pixels of the first resolution included in the pixel block of size of a pixel of the second resolution to the same value.

By setting the pixel values in this manner, the reproducibility of colors can be increased and degradation of image quality in terms of the appearance of the image that arises with creation of the image data for transfer and creation of the image data based on the image data for transfer can be suppressed.

Twelfth Aspect

The image-transferring system according to the ninth aspect, wherein the image data for transfer includes an identifier that identifies a pixel of the first resolution or a pixel of the second resolution.

As a result of the image data for transfer including such an identifier, when the image data is created on the basis of the image data for transfer in the data-receiving apparatus, which of the first resolution and the second resolution, pixels constituting each block are expressed with, can be easily discriminated.

Thirteenth Aspect

A data-transmitting apparatus that transmits image data for transfer created from image data that represents an image composed of pixels of a first resolution, includes a determining unit that, for a pixel block that is of a size of a pixel of a second resolution that is lower than the first resolution, determines whether or not the pixel block is homogenous on the basis of a difference in color information for a target pixel of the first resolution included in the pixel block; an image-data-for-transfer creating unit that creates image data for transfer by changing pixels of the first resolution included in a pixel block that has been determined to be homogenous from the first resolution to the second resolution; and a transmitting unit that transmits the image data for transfer.

Since the image data for transfer is created by changing pixel blocks that have been determined to be homogenous to the comparatively low second resolution prior to being transmitted to data-receiving apparatus, the data-transmitting apparatus of the thirteenth aspect can reduce the amount of image data to be transferred to a low level.

Fourteenth Aspect

A data-receiving apparatus includes a receiving unit that receives image data for transfer that includes pixels of a first resolution and pixels of a second resolution that is lower than the first resolution; and a high-resolution-image-data creating unit that creates image data representing an image composed of pixels of the first resolution by changing pixels of the second resolution in the image data for transfer from the second resolution to the first resolution.

According to the data-receiving apparatus of the fourteenth aspect, since the image data of the first resolution is created by changing pixel blocks that are expressed using the second resolution to the comparatively higher first resolution, an image of a comparatively high resolution can be obtained on the basis of the image data for transfer, which is a comparatively small amount of data.

Fifteen Aspect

An image-transferring method for transferring an image composed of pixels of a first resolution, including: (a) determining, for a pixel block that is of a size of a pixel of a second resolution that is lower than the first resolution, whether or not the pixel block is homogenous on the basis of a difference in color information for a target pixel of the first resolution included in the pixel block; (b) creating image data for transfer by changing pixels of the first resolution included in a pixel block that has been determined to be homogenous in (a) from the first resolution to the second resolution; (c) transmitting the image data for transfer; (d) receiving the image data for transfer; and (e) creating image data representing an image composed of pixels of the first resolution by changing pixels of the second resolution in the image data for transfer from the second resolution to the first resolution.

In the image-transferring method according to the fifteen aspect, since the image data for transfer is created by changing pixel blocks that have been determined to be homogenous to the comparatively low second resolution prior to being transmitted, the amount of data to be transferred can be reduced to a low level. Furthermore, since the image data for transfer is created by changing only homogenous pixel blocks to the second resolution while maintaining inhomogenous pixel blocks at the comparatively high first resolution, degradation of the image quality in terms of the appearance of the image can be suppressed when creating the image data on the basis of the image data for transfer. In addition, since processing to divide a text area and a graphic area into separate images is not performed, loss of data can be suppressed when creating the image data on the basis of the image data for transfer.

Sixteenth Aspect

A computer program for transferring an image composed of pixels of a first resolution, the computer program causing a computer to realize functions of: determining, for a pixel block that is of a size of a pixel of a second resolution that is lower than the first resolution, whether or not the pixel block is homogenous on the basis of a difference in color information for a target pixel of the first resolution included in the pixel block; creating image data for transfer by changing pixels of the first resolution included in a pixel block that has been determined to be homogenous from the first resolution to the second resolution; transmitting the image data for transfer; receiving the image data for transfer; and creating image data representing an image composed of pixels of the first resolution by changing pixels of the second resolution in the image data for transfer from the second resolution to the first resolution.

In the computer program according to the sixteenth aspect, since the image data for transfer is created by changing pixel blocks that have been determined to be homogenous to the comparatively low second resolution prior to the image data for transfer being transmitted, the amount of data to be transferred can be reduced to a low level. Furthermore, since the image data for transfer is created by changing only homogenous pixel blocks to the second resolution while maintaining inhomogenous pixel blocks at the comparatively high first resolution, degradation of the image quality in terms of the appearance of the image can be suppressed when creating the image data on the basis of the image data for transfer. In addition, since processing to divide a text area and a graphic area into separate images is not performed, loss of data can be suppressed when creating the image data on the basis of the image data for transfer.

Seventeenth Aspect

A computer-readable recording medium on which the computer program according to the sixteenth aspect has been recorded.

According to the seventeenth aspect, the computer program according to the sixteenth aspect can be caused to be read out in a computer by using the recording medium.

BRIEF DESCRIPTION OF THE DRAWINGS

The invention will be described with reference to the accompanying drawings, wherein like numbers reference like elements.

FIG. 7 is an explanatory diagram schematically illustrating the flow of the homogeneity-determining processing.

DESCRIPTION OF EXEMPLARY EMBODIMENTS

Hereafter, best modes for carrying out the invention will be described on the basis of embodiments.

A. First Embodiment

A1. System Configuration

Figure 1:
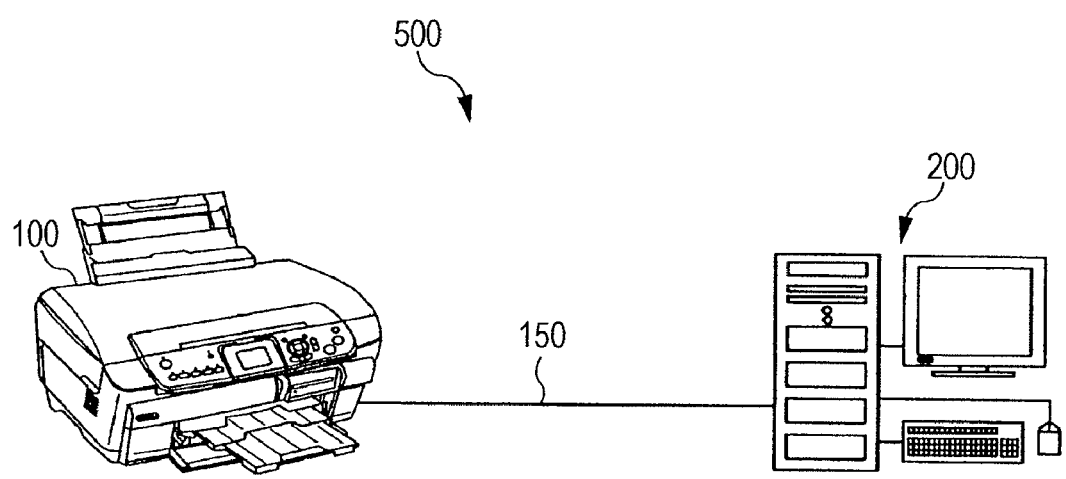
FIG. 1 is an explanatory diagram illustrating an outline of a configuration of an image-transferring system 500 of a first embodiment of the invention.

FIG. 1 is an explanatory diagram illustrating an outline of a configuration of an image-transferring system 500 of a first embodiment of the invention. The image-transferring system 500 includes a multifunction apparatus 100 and a personal computer 200. The multifunction apparatus 100 and the personal computer 200 are connected to each other through a cable 150. As a connection interface between the multifunction apparatus 100 and the personal computer 200, for example, a LAN (local area network), such as a USB (universal serial bus) interface or an IEEE802.3 interface, can be adopted. A wireless connection such as a wireless LAN connection of the IEEE802.11b standard or an infrared connection of the IrDA (Infrared Data Association) standard can be adopted instead of a wired connection that uses a cable.

The multifunction apparatus 100 functions as a printer, a scanner and a photocopier. In the image-transferring system 500, image data can be transferred from the personal computer 200 and caused to be printed in the multifunction apparatus 100.

Figure 2:
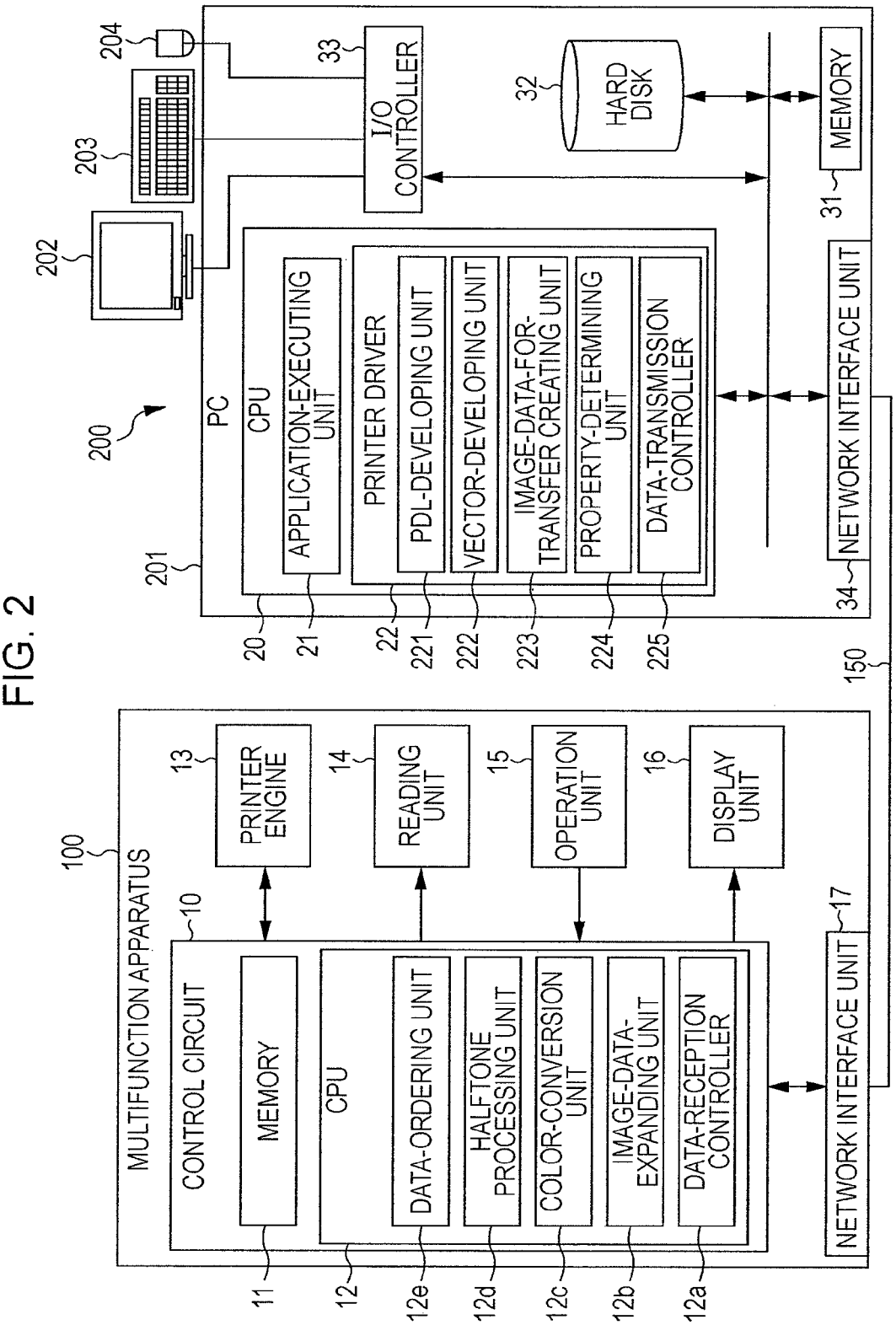
FIG. 2 is an explanatory diagram illustrating the configuration of the image-transferring system 500 illustrated in FIG. 1 in more detail.

FIG. 2 is an explanatory diagram illustrating the configuration of the image-transferring system 500 illustrated in FIG. 1 in more detail. The personal computer 200 includes a computer main unit 201, a display device 202, a keyboard 203 and a mouse 204. The computer main unit 201 includes a CPU 20, a memory 31, a hard disk 32, an I/O controller 33 and a network interface unit 34.

An application program that handles images is stored in the memory 31 and the CPU 20 functions as an application-executing unit 21 by executing the application program. For example, an image-viewing application (Acrobat Reader (registered trademark) produced by Adobe Systems Ltd. or the like) or retouching software can be adopted as the application that handles images. In addition, device driver programs for the multifunction apparatus 100 (a printer-driver program and a scanner-driver program) are stored in the memory 31. The CPU 20 functions as a printer driver 22 by executing the printer-driver program. The printer driver 22 includes a PDL- (printer description language) developing unit 221, a vector-developing unit 222, an image-data-for-transfer creating unit 223, a property-determining unit 224 and a data-transmission controller 225.

The application-executing unit 21 performs display and manipulation of an image in accordance with instructions of a user. The PDL-developing unit 221 analyzes print data written in PDL and develops the print data into raster image data. The raster image data consists of tone values of, for example, R (red), G (green) and B (blue) (eight bits×three channels) and an x (additional information) value (eight bits× one channel), where x is additional information regarding a property (text area or graphic area) of a pixel. Data consisting of eight bits and three channels (R, G, B) with no x (additional information) can also be adopted as the raster image data. The vector-developing unit 222 develops vector data into raster image data. The image-data-for-transfer creating unit 223 converts (compresses) the raster image data into image data for transfer, which is a smaller amount of data. The data-transmission controller 225, together with converting the image data for transfer into data of a format that corresponds to the connection interface between the multifunction apparatus 100 and the personal computer 200, performs error control, flow control and the like with respect to data transmission timing. The property-determining unit 224 will be described in detail below.

The I/O controller 33 includes interfaces for respectively connecting the display device 202, the keyboard 203, the mouse 204 and the like to the computer main unit 201. The I/O controller 33 controls transmission of display screen data to the display device 202 and reception of input information from the keyboard 203 and the mouse 204. The network interface unit 34 is composed of a group of connection interfaces with the multifunction apparatus 100.

The multifunction apparatus 100 includes a control circuit 10, a printer engine 13, a reading unit 14, an operation unit 15, a display unit 16 and a network interface unit 17. The control circuit 10 includes a memory 11 and a CPU 12. A control program for controlling the multifunction apparatus 100 is stored in the memory 11 and the CPU 12 functions as a data-reception controller 12a, an image-data expanding unit 12b, a color-conversion unit 12c, a halftone processing unit 12d and a data-ordering unit 12e by executing the control program.

The data-reception controller 12a receives the image data for transfer that has been transmitted from the personal computer 200. The image-data expanding unit 12b expands the image data for transfer and creates raster image data, which is data of a high-resolution image. The color-conversion unit 12c converts (color converts) the raster image data (R, G, B) into image data consisting of individual tone values of ink colors (cyan (C), magenta (M), yellow (Y) and black (K)) used in the printer engine 13. The color-conversion unit 12c performs the above-described color conversion by referring to a color-conversion table (not illustrated), which is a three-dimensional lookup table stored in the memory 11. The halftone processing unit 12d converts the image data that has been subjected to color conversion into print data by performing halftone processing thereon. The print data represents on/off of dots for the individual colors (C, M, Y, K). The data-ordering unit 12e orders the print data obtained by the halftone processing into a data layout that corresponds to an ink head, nozzle numbers and the like in the printer engine 13.

The printer engine 13 is a printing mechanism of an ink jet type and includes an ink head (not illustrated). The printer engine 13 prints an image or the like on a printing sheet by performing scanning of a sheet and the ink head and by performing ink discharge or the like. The reading unit 14 is a scanner of a so-called flatbed type (type in which original is fixed in place) that reads an original that has been fixed in place while an image sensor (not illustrated) moves. The operation unit 15 includes various operation buttons and receives operation inputs from a user. The display unit 16 displays an operation menu screen, error messages and the like.

The image-transferring system 500 having the above-described configuration, is configured such that reduction of image quality in terms of the appearance of a printed image is suppressed while the amount of data of image data to be transferred to the multifunction apparatus 100 from the personal computer 200 is reduced by performing the image-data-for-transfer creating processing to be described below.

The above-described property-determining unit 224 corresponds to the determining unit of an aspect of the invention. Furthermore, The data-transmission controller 225 and the network interface unit 34 correspond to the transmitting unit of an aspect of the invention, the network interface unit 17 and the data-reception controller 12a correspond to the receiving unit of an aspect of the invention and the image-data expanding unit 12b corresponds to the high-resolution-image-data creating unit of an aspect of the invention.

A2. Image Data Transmission Processing

When a user executes the application that handles images in the personal computer 200 and attempts to perform printing of an image displayed on the display device 202, the user selects a perform printing menu (not illustrated) from the application menu screen. At this time, the user can cause a setting screen for the printer driver to be displayed on the display device 202 and can set settings such as designation of the printing apparatus to be used and the print quality.

Figure 3:
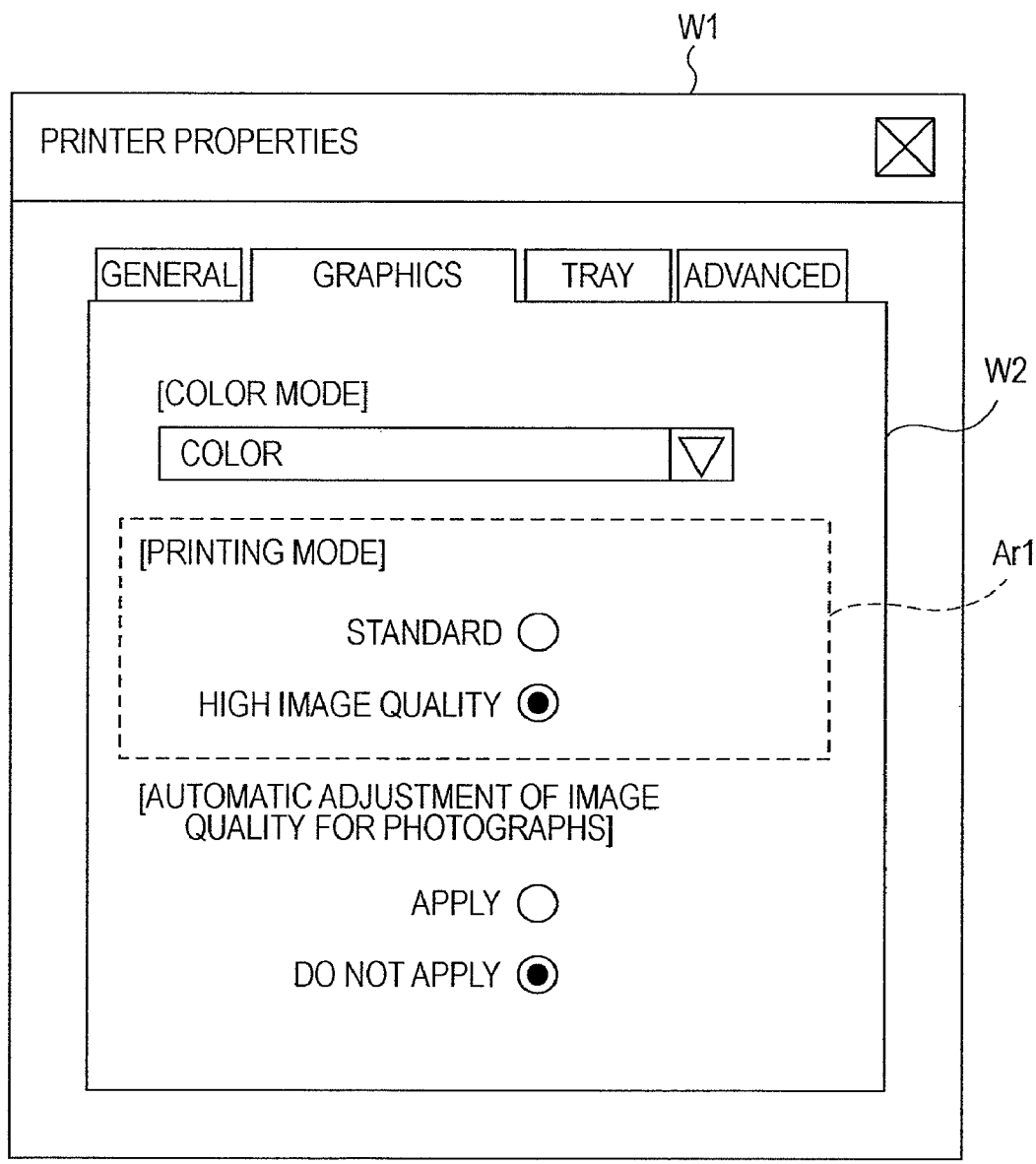
FIG. 3 is an explanatory diagram illustrating a setting screen for a printer driver displayed on a display device 202.

FIG. 3 is an explanatory diagram illustrating a printer-driver setting screen W1 that is displayed on the display device 202. The printer-driver setting screen W1 is created by the printer driver 22 and is displayed on the display device 202. The printer-driver setting screen W1 includes a plurality of setting screens divided into four tabs (general, graphics, tray, advanced). In the example illustrated in FIG. 3, a graphics setting screen W2 has been selected. The graphics setting screen W2 includes a printing-mode setting area Ar1. The printing-mode setting area Ar1 is an area for setting a printing mode in accordance with the desired appearance of an image and includes buttons for selectively specifying a standard-image-quality printing mode or a high-image-quality printing mode. The standard-image-quality printing mode is a printing mode for performing printing of an image of comparatively low resolution and the high-image-quality printing mode is a printing mode for performing printing of an image of comparatively high resolution. For example, 600 dpi×600 dpi (height×width) can be adopted as the resolution in the standard-image-quality printing mode and, for example, 2400 dpi×2400 dpi can be adopted as the resolution in the high-image-quality printing mode.

Hereafter, as an example, a case will be described in which the high-image-quality printing mode (2400 dpi×2400 dpi) has been set as the printing mode in the above-described printer-driver setting screen W1 and in which the resolution of the image that the user is attempting to print is (2400 dpi×2400 dpi).

When the application-executing unit 21 (FIG. 2) receives a printing instruction from the user, the application-executing unit 21 creates print data written in PDL and vector data in accordance with the printing instruction. The PDL-developing unit 221 analyzes and develops the print data into raster image data composed of color information (R, G, B, x) for all the pixels. The vector-developing unit 222 develops the vector data into raster image data. The image-data-for-transfer creating unit 223 performs image-data-for-transfer creating processing, to be described below, and converts (compresses) the raster image data into image data for transfer. The data-transmission controller 225 converts the image data for transfer into a data format corresponding to the connection interface between the multifunction apparatus 100 and the personal computer 200, and transmits the data via the network interface unit 34 to the multifunction apparatus 100. In the case in which the standard-image-quality printing mode has been selected as the printing mode, the image data for transfer, for which the image-data for-transfer creating processing to be described below would have been performed, is not created. Therefore, in such a case, the data-transmission controller 225 transmits the raster image data created by the PDL-developing unit 221 and the vector-developing unit 222 to the multifunction apparatus 100 via the network interface unit 34.

A3. Image-Data-for-Transfer Creating Processing

Figure 4:
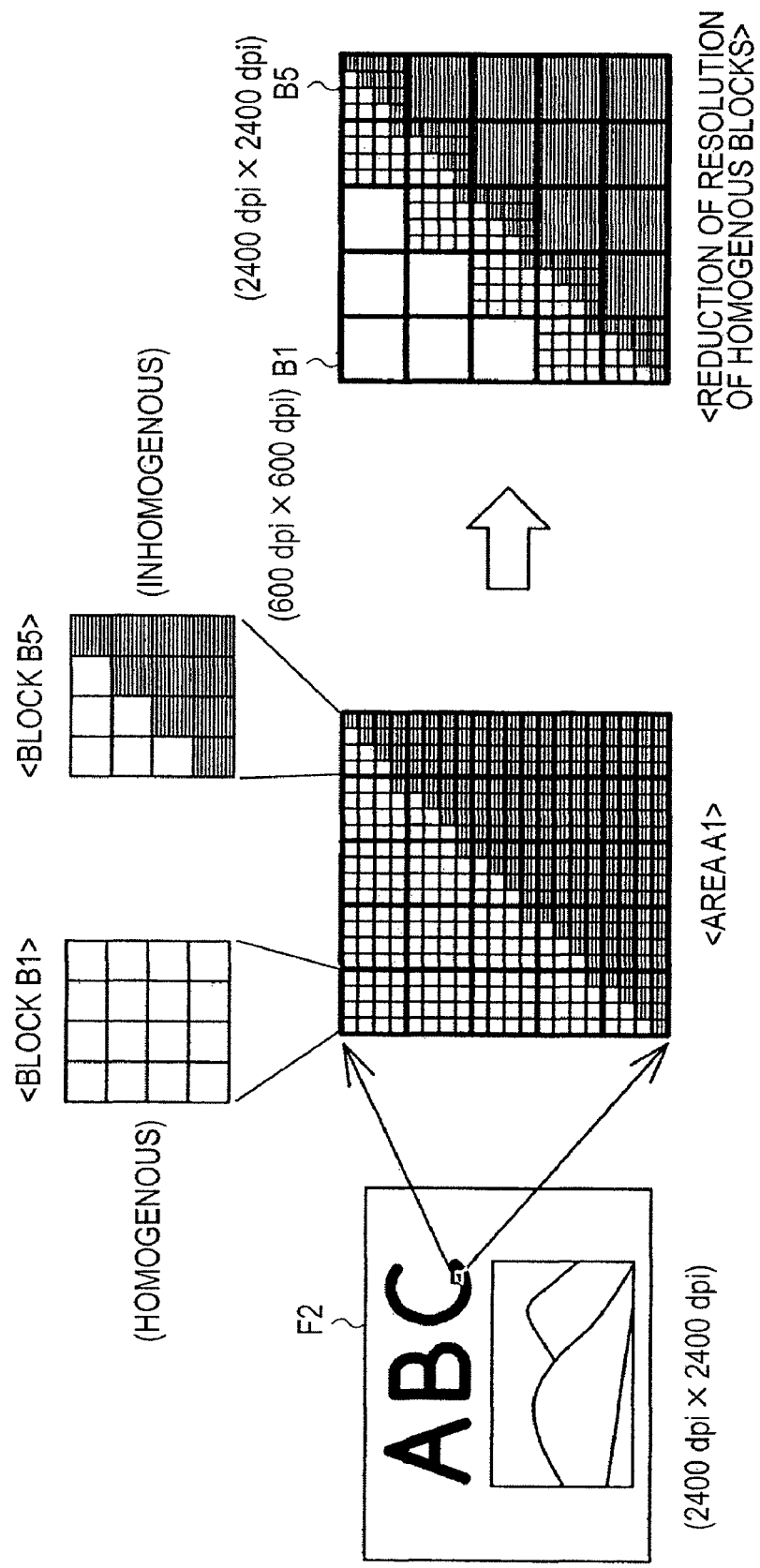
FIG. 4 is an explanatory diagram schematically illustrating an outline of the flow of image-data-for-transfer creating processing.

FIG. 4 is an explanatory diagram schematically illustrating an outline of the flow of the image-data-for-transfer creating processing. In FIG. 4, the process of creating image data for transfer for an image F2 (resolution=2400 dpi×2400 dpi) is illustrated. First, the image F2 is divided into blocks and, for each of the blocks, it is determined whether an image shown in the block is homogenous or not. In the present embodiment, each block is composed of sixteen pixels (four pixels vertically×four pixels horizontally). In FIG. 4, an area A1 within the image F2 is taken as an example to illustrate the process. Then, it is determined whether a block is homogenous for each of a total of twenty-five blocks included in the area A1. Here, "homogenous" means that individual pixels constituting the block all show the same image (color). For example, it means a case in which the values of individual pixels within a block are all the same or a case in which differences among values of the individual pixels are comparatively small. In the present embodiment, the case in which the values of individual pixels are all the same is taken to be "homogenous".

As results of determination of whether or not individual blocks are homogenous, for example, a block B1 and a block B5 included in the area A1 are determined to be homogenous and inhomogenous, respectively. Then, image data for transfer is created by recording one piece of color information (R, G, B, x) for a block that is homogenous and recording color information (R, G, B, x) for respective pixels (sixteen pixels) for a block that is inhomogenous. In other words, the image data for transfer is created by reducing the resolution of a homogenous block while maintaining the high resolution of an inhomogenous block. In this way, the image-transferring system 500 is configured to reduce the amount of data to be transferred by representing a homogenous block with one piece of color information by performing the image-data-for-transfer creating processing. Since, for a homogenous block, sixteen pixels (four pixels×four pixels) are represented by one pixel (one pixel×one pixel), the resolution can be reduced from 2400 dpi×2400 dpi (height×width) to 600 dpi×600 dpi (height×width). The low-resolution image data and the high-resolution image data are arranged together in the image data for transfer.

Figure 5:
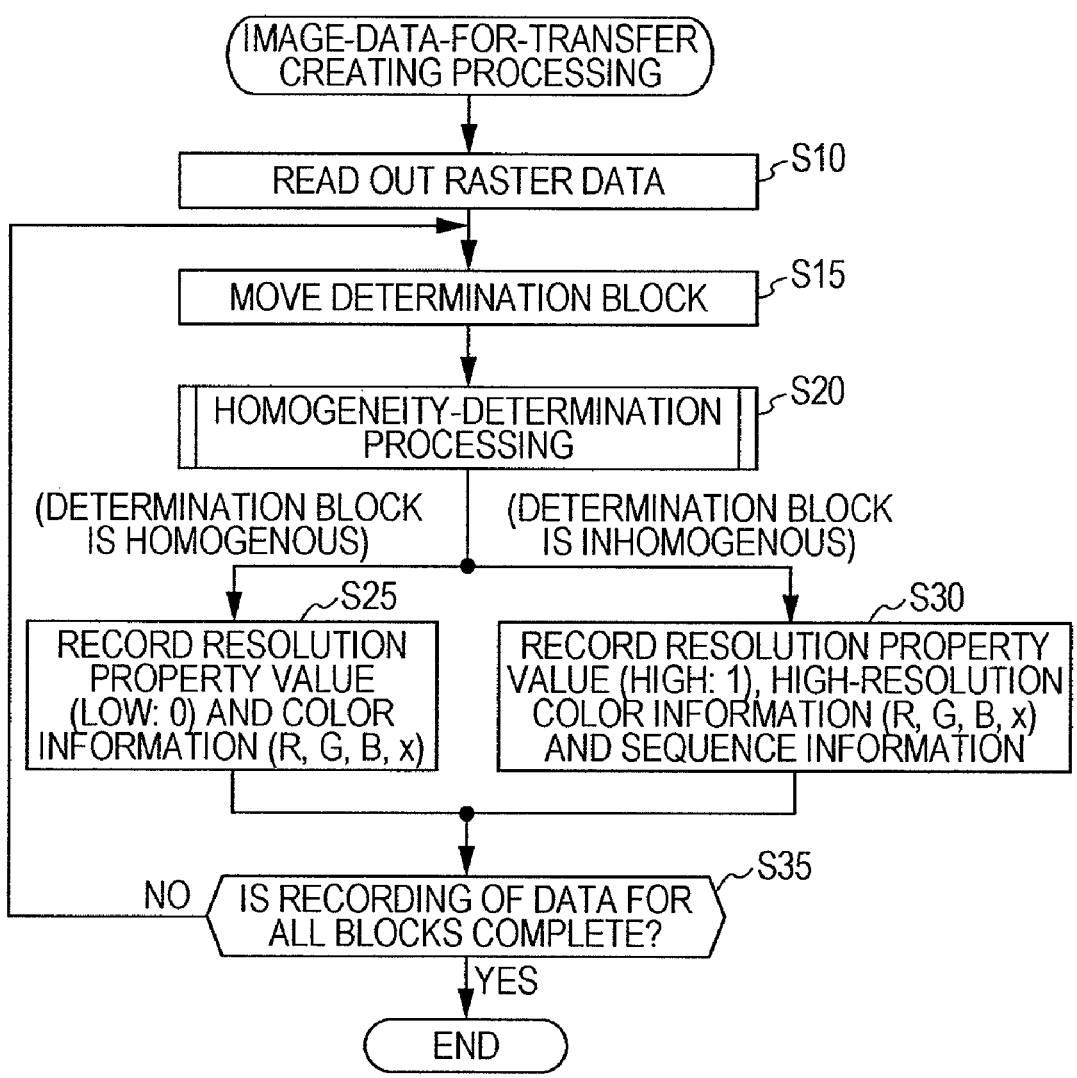
FIG. 5 is a flowchart illustrating the flow of the image-data-for-transfer creating processing in more detail.

FIG. 5 is a flowchart illustrating in detail the flow of the image-data-for-transfer creating processing. The image-data-for-transfer creating unit 223 reads out raster image data created by the PDL-developing unit 221 or the vector-developing unit 222 from the memory 31 (step S10). Next, the image-data-for-transfer creating unit 223, moves the block that is a target of homogeneity determination (determination block) by one block in the image represented by the raster image data (step S15). The moving of the determination block is started from the block in the upper left corner of the image and proceeds one block at a time in the rightward direction until the side of the image in the rightward direction is reached. The determination block is then moved downward by one row and over to the left side of the image, whereupon the process is repeated in this manner until complete. After the determination block is moved by one block, the property-determining unit 224 performs homogeneity-determination processing (step S20).

Figure 6:
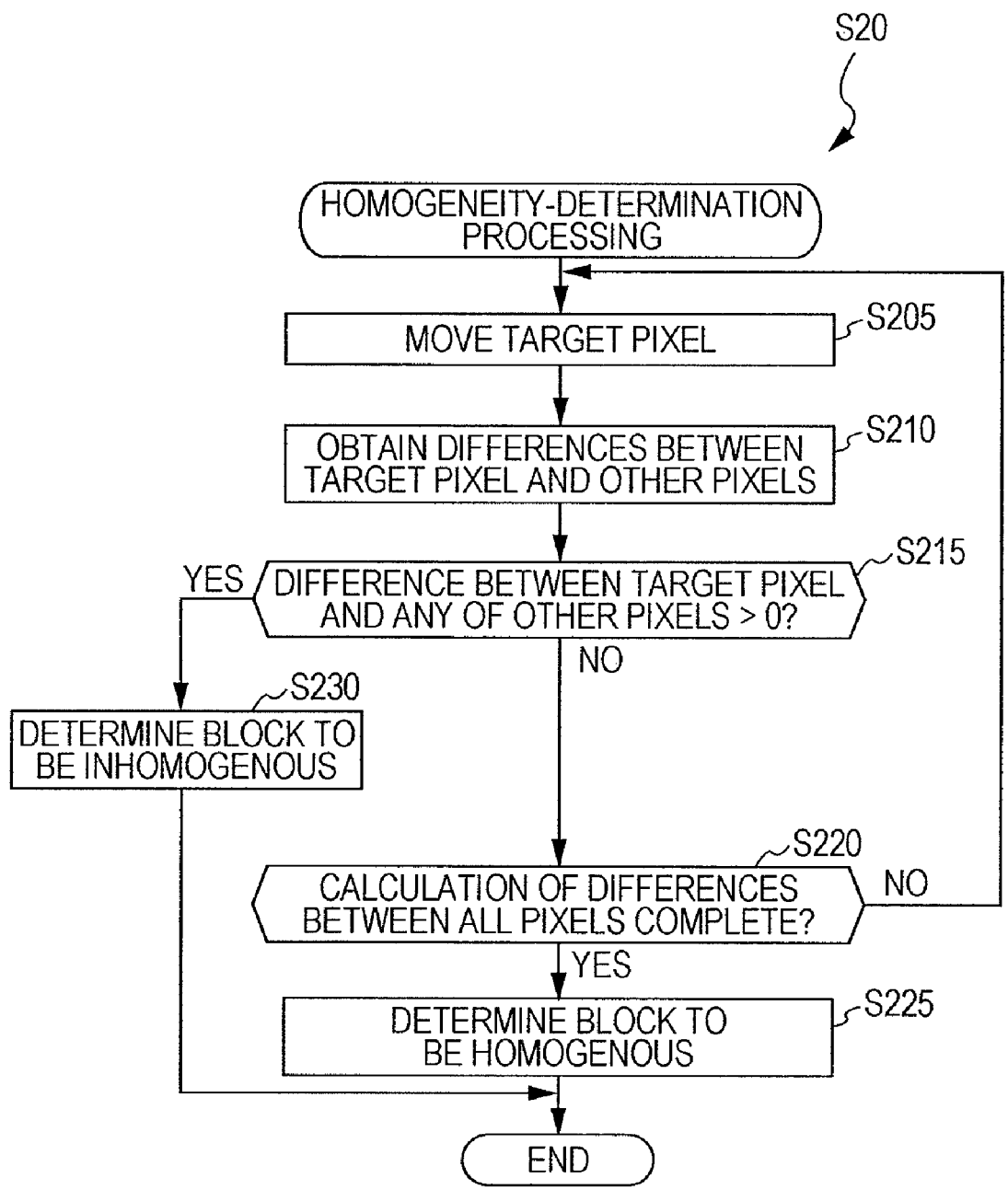
FIG. 6 is a flowchart illustrating the flow of the homogeneity-determining processing illustrated in FIG. 5 in more detail.

FIG. 6 is a flowchart illustrating in detail the flow of the homogeneity-determination processing illustrated in FIG. 5. Furthermore, FIG. 7 is an explanatory diagram schematically illustrating the flow of the homogeneity-determination processing. The upper part of FIG. 7 illustrates moving of a target pixel, which is described below, and the lower part of FIG. 7 illustrates the results of the homogeneity-determination processing for two different blocks Bm and Bn.

First, the property-determining unit 224 moves the pixel that is to be a target of processing (target pixel) by one pixel among the sixteen pixels constituting the determination block (FIG. 6: step S205). When step S205 is performed for the first time, as shown in the upper part of FIG. 7, a pixel g1 in the upper left corner becomes the target pixel. Then, each time step S205 is performed, the target pixel is moved by one pixel in the rightward direction until a pixel g4 is reached and then a pixel g5 at the left side of the image and one row lower is made to be the target pixel. The target pixel is repeatedly moved in this way until finally a pixel g16 in the lower right corner is made to be the target pixel.

After moving the target pixel, the property-determining unit 224 obtains a difference between the target pixel and each of the other pixels (FIG. 6: step S210). These differences are each a difference in color information (R, G, B), and, for example, the property-determining unit 224 can obtain the absolute values of differences in respective colors between the target pixel and another pixel and employ a value obtained by adding the absolute values of these differences together. As shown in the upper part of FIG. 7, in the case where the pixel g1 is made to be the target pixel, the property-determining unit 224 obtains the absolute values of differences between the pixel g1 and each of the other pixels g2-g16.

Next, the property-determining unit 224 determines whether or not a difference between the target pixel and any of the other pixels is greater than zero (step S215). In the case where all the differences are zero, the property-determining unit 224 determines whether or not the calculation of differences between all of the pixels is complete (step S220). In the case where the property-determining unit 224 determines that the calculation of differences between all of the pixels is not yet complete, the property-determining unit 224 returns to step S205 and moves the target pixel by one pixel and then performs steps S210-S220 once more. On the other hand, in the case where the property-determining unit 224 determines that the calculation of the differences between all of the pixels is complete, the property-determining unit 224 determines that the determination block is homogenous (step S225).

In the above-described step S215, in the case where a difference between the target pixel and any of the other pixels is greater than zero, the property-determining unit 224 determines that the determination block is inhomogenous (step S230). In the example illustrated in the lower part of FIG. 7, for the block Bm, as a result of differences obtained between all the pixels, the block Bm is determined to be "homogenous", because all of the differences are zero. On the other hand, for the block Bn, differences between the pixel g1 and the seven pixels g2, g5, g6, g9, g10, g13, and g14 are each greater than zero. Consequently, some of the differences calculated when the pixel g1 is made to be the target pixel are greater than zero and the block Bn is determined to be inhomogenous.

Returning to FIG. 5, in the case where the determination block is determined to be homogenous as a result of the homogeneity-determination processing (step S20), the image-data-for-transfer creating unit 223 records a resolution property value and color information (R, G, B, x) in the memory 31 (step S25). The resolution property value is an identifier that denotes whether a pixel constitutes a low-resolution block or a high-resolution block, "0" being used for the case of low resolution and "1" being used for the case of high resolution. The information of the resolution property value can be expressed using an arbitrary number of bits (for example, one bit or one byte). Since the determination block has been determined to be homogenous in step S25, "0" is recorded as the resolution property value.

In the case where the determination block is determined to be inhomogenous as a result of the above-described homogeneity-determination processing (step S20), the image-data-for-transfer creating unit 223 records a resolution identifier (in this case "1"), high-resolution color information (R, G, B, x) and sequence information in the memory 31 (step S30). Then, after steps S25 and S30, the image-data-for-transfer creating unit 223 determines whether or not recording of data for all blocks is complete (step S35). In the case where recording of data for some of the blocks is not yet complete, the image-data-for-transfer creating unit 223 returns to the above-described step S15. On the other hand, in the case where recording of data for all of the blocks is complete, the image-data-for-transfer creating processing is complete.

Figure 8:
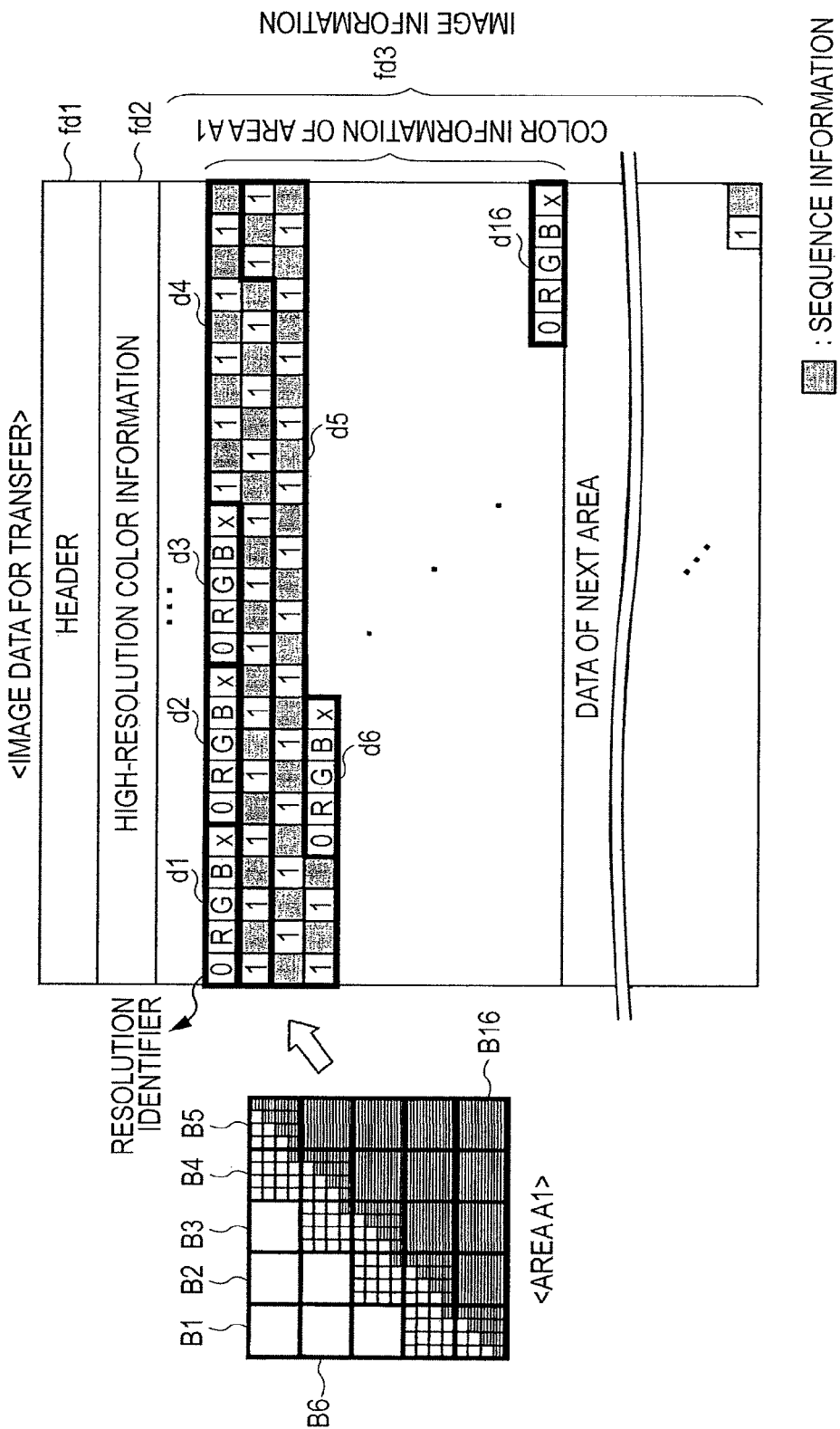
FIG. 8 is an explanatory diagram illustrating a data format of image data for transfer created by image-data-for-transfer creating processing.

FIG. 8 is an explanatory diagram illustrating a data format of image data for transfer created by the image-data-for-transfer creating processing. The image data for transfer includes a header field fd1, a high-resolution color information field fd2 and an image information field fd3. In the header field fd1, the size of each field, the size of the image, the amount of data per one pixel and the like are recorded. In the high-resolution color information field fd2, color information (R, G, B, x) of each pixel included in a block determined to be inhomogenous is recorded. The high-resolution color information field fd2 will be described in more detail below. Color information of each of the pixels is recorded in the image information field fd3. In the example illustrated in FIG. 8, the color information is illustrated in detail by using the area A1 illustrated in the above-described FIG. 4 as a representative example.

In FIG. 8, data d1 shows color information of the block B1 in the area A1. Similarly, data d2, data d3, data d4, data d5, data d6, and data d16 show color information of block B2, block B3, block B4, block B5, block B6 and block B16, respectively. Data (color information) for the area A1 is recorded in the image information field fd3 in the order of blocks B1, B2, B3, ..., B16. Here, the block B1 is homogenous. Therefore, as a result of the above-described image-data-for-transfer creating processing, a resolution identifier "0" and color information (R, G, B, x) are recorded as the data d1. At this time, just one piece of color information (R, G, B, x) is recorded, rather than recording color information for each of the pixels constituting the block B1. Only one piece of color information is recorded for each of the blocks B2 and B3, similarly to the block B1. In the example illustrated in FIG. 8, the data d6 of the block B6 and the data d16 of the block B16 are recorded in the image information field fd3 as examples of data of other blocks that are homogenous.

On the other hand, the block B4 is inhomogenous. Therefore, as a result of the above-described image-data-for-transfer creating processing, a resolution identifier "1" and sequence information are recorded for each of the sixteen pixels constituting the block B4 as the data d4. At this time, high-resolution color information (R, G, B, x) is recorded in the high-resolution color information field fd2 for each of the pixels.

Figure 9:
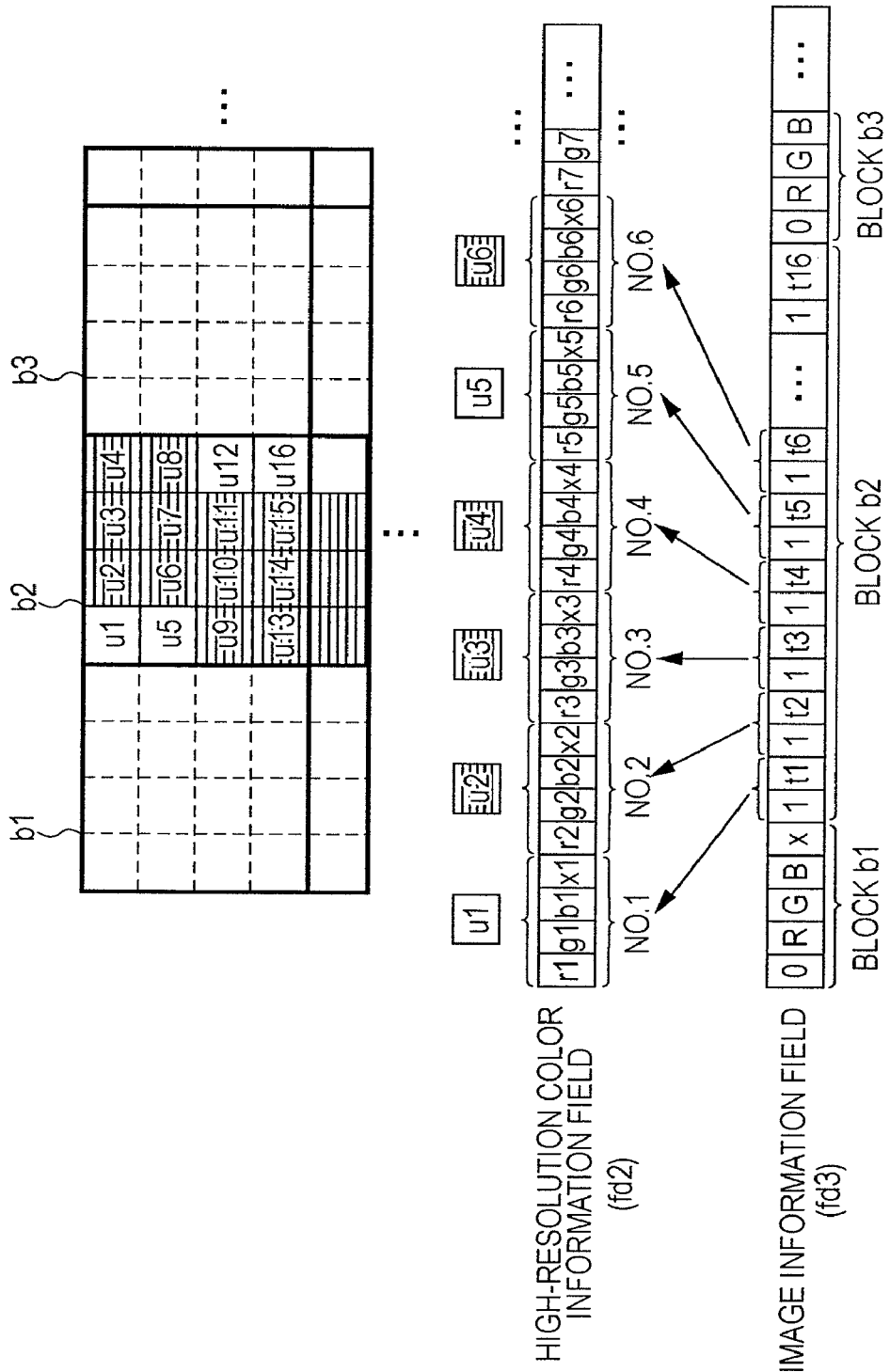
FIG. 9 is an explanatory diagram illustrating an example of data recording for image data for transfer for a pixel block determined to be inhomogenous.

FIG. 9 is an explanatory diagram illustrating an example of data recording for image data for transfer for a pixel block that has been determined to be inhomogenous. In the example illustrated in FIG. 9, an example of data recording is illustrated for a block b2 that has been determined to be inhomogenous and for two blocks b1 and b3 that are adjacent to the block B2 and have been determined to be homogenous. The block B1 is a block positioned in the upper left corner of the image (not illustrated).

Since the block b1 is homogenous, a resolution identifier "0" and color information (R, G, B, x) are recorded in the image information field fd3 (FIG. 8). Since the next block b2 is inhomogenous, a resolution identifier "1" and sequence information t1-t16 are recorded in this order for respective pixels u1-u16 constituting the block b2. Specifically, for example, first, a resolution identifier "1" and sequence information t1 are recorded for the pixel u1, and then next a resolution identifier "1" and sequence information t2 are recorded for the pixel u2.

Here, in addition to recording of the resolution identifier "1" and the sequence information t1 for the pixel u1, color information (r1, g1, b1, x1) of the pixel u1 is recorded at the front of the high-resolution color information field fd2. The sequence information t1 indicates the sequential position (first) of the color information of the pixel u1 in the high-resolution color information field fd2. Similarly, in addition to recording of the resolution identifier "1" and sequence information t2 for the pixel u2, color information (r2, g2, b2, x2) of the pixel u2 is recorded in the high-resolution color information field fd2. At this time, the color information (r2, g2, b2, x2) of the pixel u2 is recorded subsequent to the color information (r1, g1, b1, x1) of the pixel u1. Therefore, the sequence information t2 indicates the sequential position (second) of the color information of the pixel u2 in the high-resolution color information field fd2. In this way, for all the pixels u1-u16 of the block b2, a resolution identifier "1" and sequence information t1-t16 are recorded in the image information field fd3 and color information is recorded in the high-resolution color information field fd2.

As can be understood from the above-described example of FIG. 8, since a homogenous block is represented using one resolution identifier "0" and one piece of color information (R, G, B, x), the amount of data is reduced compared with the case of recording color information (R, G, B, x) for each of the sixteen pixels included in the block.

A4. Image Data Reception Processing

In the multifunction apparatus 100 (FIG. 2), the data-reception controller 12a receives the image data for transfer transmitted from the personal computer 200 via the network interface unit 17. The image-data-expanding unit 12b creates raster image data, which is high-resolution image data, from the image data for transfer by performing expansion processing to be described below.

Figure 10:
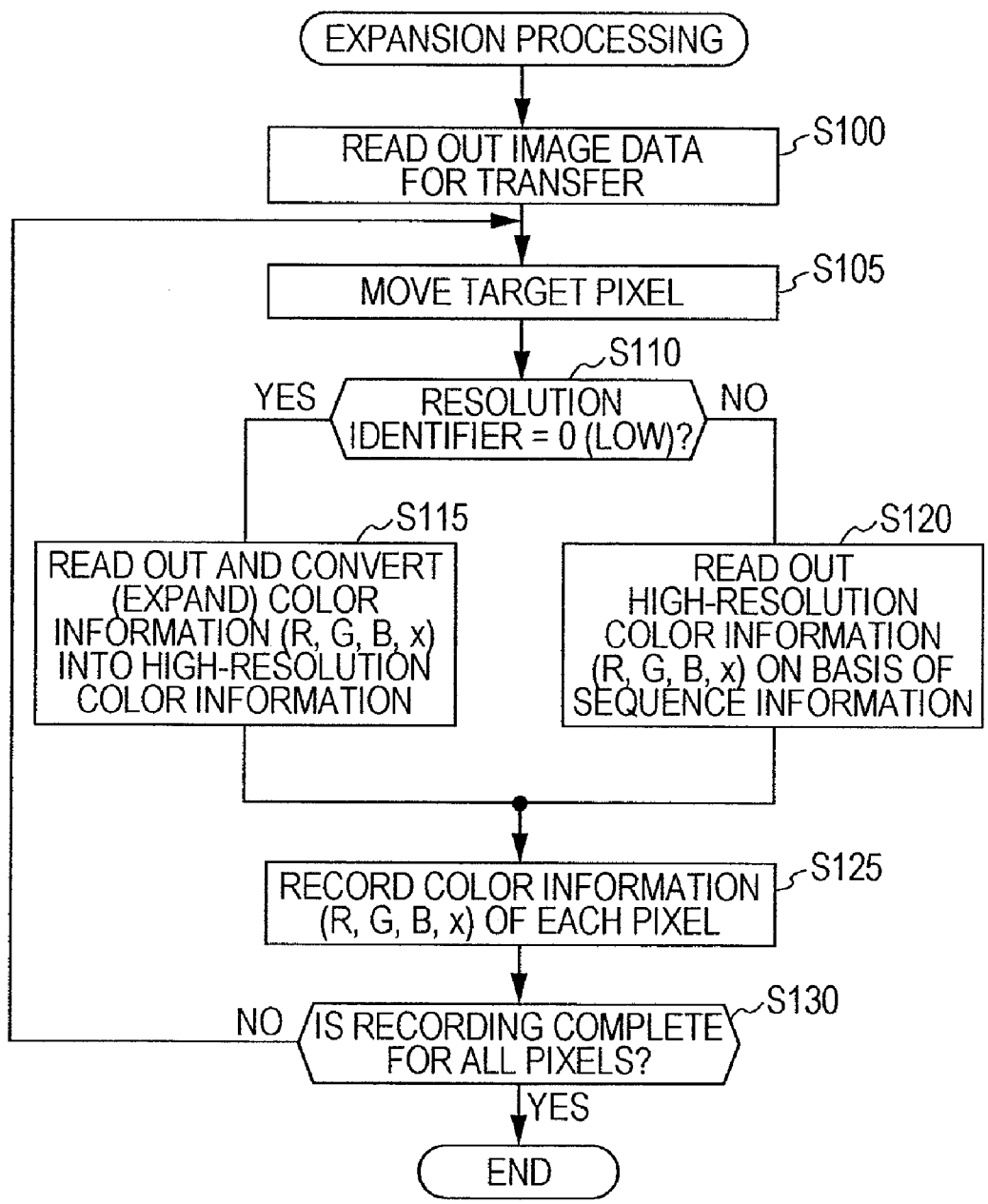
FIG. 10 is a flowchart illustrating the flow of expansion processing performed by an image-data-expanding unit 12b.
Figure 11:
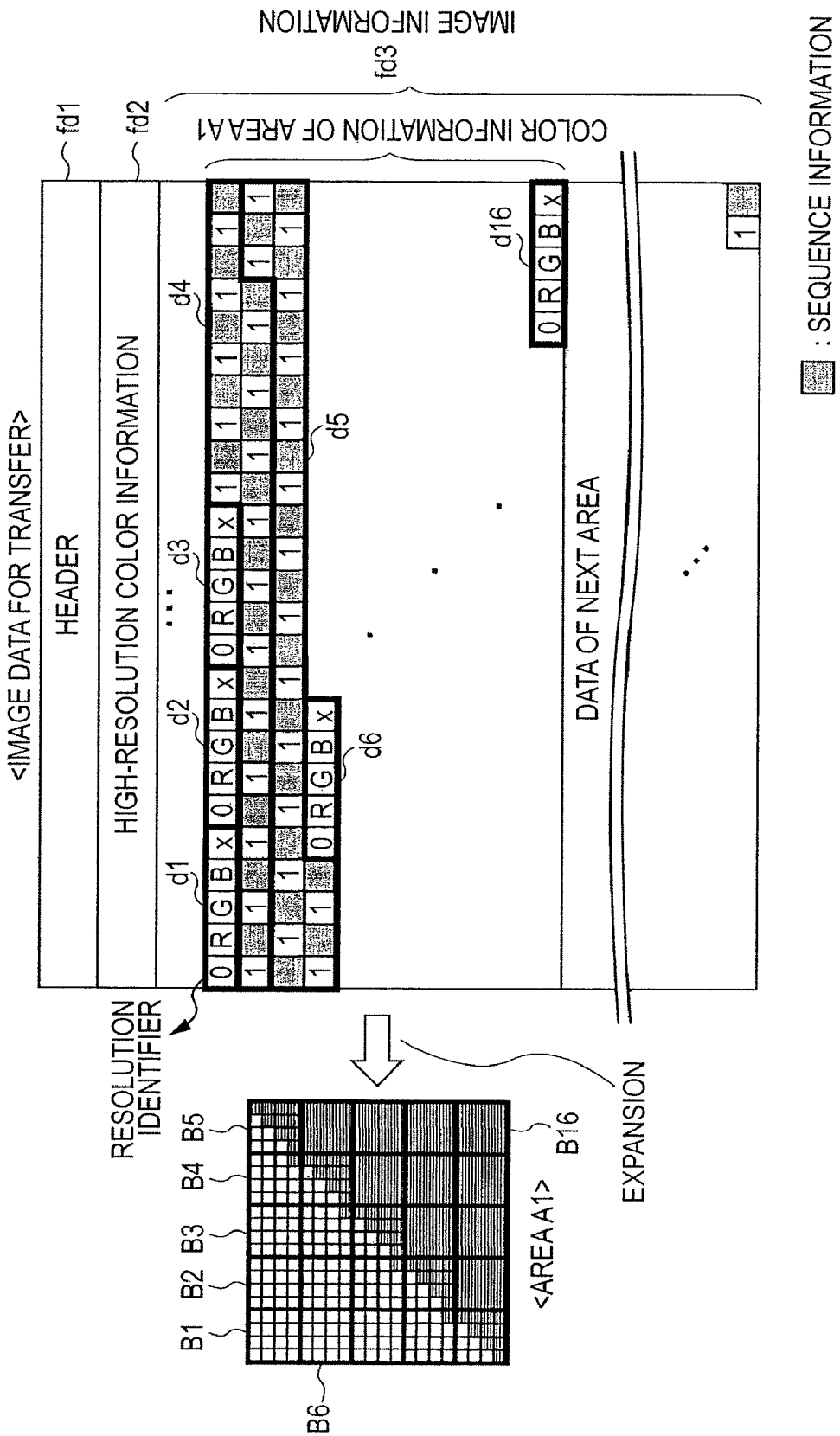
FIG. 11 is an explanatory diagram illustrating a result of expansion processing for an area A1 illustrated in FIG. 4.

FIG. 10 is a flowchart illustrating the flow of the expansion processing performed by the image-data-expanding unit 12b. FIG. 11 is an explanatory diagram illustrating results of the expansion processing for the area A1 illustrated in FIG. 4. The data format illustrated in FIG. 11 is the same as the data format illustrated in FIG. 8.

The image-data-expanding unit 12b reads out the image data for transfer received by the data-reception controller 12a from the memory 11 (step S100). Next, the image-data-expanding unit 12b moves the target pixel for which expansion is to be performed (step S105). Specifically, the image-data-expanding unit 12b moves the target pixel in the order of the color information recorded in the image information field fd3. Next, the image-data-expanding unit 12b determines whether or not the resolution identifier assigned to the target pixel is "0" (that is, whether or not the target pixel constitutes a low-resolution block) (step S110).

In the case where the identifier assigned to the target pixel is "0", the image-data-expanding unit 12b reads out the color information (R, G, B, x) from the image information field fd3 and converts (expands) the color information (R, G, B, x) into high-resolution color information (step S115). Here, the high-resolution color information is color information of every pixel in an image of the high resolution (2400 dpi×2400 dpi). For example, the data d1 (FIG. 8) corresponds to color information of one pixel of an image of the low resolution (600 dpi×600 dpi) and the image-data-expanding unit 12b converts the data d 1 into respective color information of sixteen pixels for an image of high resolution (2400 dpi×2400 dpi). At this time, the color information of each of the pixels is set to the color information (R, G, B, x) of the data d1.

Reduction of the image quality in terms of the appearance of the image can be suppressed while reducing the amount of data to be transferred by using a configuration in which each pixel included in a block that has been determined to be homogenous is represented by the same piece of color information.

In the above-described step S110, in the case where the resolution identifier is determined to be "1", the image-data-expanding unit 12b reads out color information from the high-resolution color information field fd2 on the basis of the sequence information (step S120). For example, for the first pixel u1 of the block b2 illustrated in FIG. 9, color information (R, G, B, x) recorded at the front (first position) of the high-resolution color information field fd2 is read out on the basis of the sequence information t1.

Next, the image-data-expanding unit 12b records the color information expanded in step S115 and the color information read out in step S120 as described above in the memory 11 (step S125). Next, the image-data-expanding unit 12b determines whether or not recording of color information in the memory 11 is complete for all of the pixels (step S130), and in the case where it is not yet complete, the image-data-expanding unit 12b returns to the above-described step S105, moves the target pixel and performs the processing of steps S110-S130 again. On the other hand, in the case where recording of color information is complete for all of the pixels, the expansion processing is complete. As a result of the above-described expansion processing, the area A1 is reproduced as a high-resolution image.

In this way, raster image data is created in the multifunction apparatus 100, that is the same as raster image data created by the PDL-developing unit 221 or the vector-developing unit 222. Consequently, printing is performed on the basis of a high-resolution image and an aesthetically pleasing image can be obtained.

As described above, in the image-transferring system 500, since the image data for transfer is created by converting a block that has been determined to be homogenous to a low resolution and maintaining a block that has been determined to be inhomogenous at a high resolution, reduction of image quality in terms of the appearance of the image can be suppressed while reducing the amount of image data to be transferred. Consequently, the processing load for image transfer between the personal computer 200 and the multifunction apparatus 100 can be reduced and the throughput of image printing can be improved. In addition, since the resolution of blocks that were determined to be homogenous in the personal computer 200, is increased (expanded), printing of a high-resolution image can be performed in the multifunction apparatus 100. Furthermore, since processing to divide a text area and a graphic area into separate images is not performed, loss of data during expansion (synthesis) does not occur and reduction of image quality in terms of the appearance of the image can be suppressed. In addition, in the homogeneity-determining processing, in the case where a difference between the target pixel and any one of the plurality of pixels is greater than zero, since the block is determined to be inhomogenous, for example, reduction of the resolution of boundary portions of a text area and a graphic area can be avoided and degradation of the image quality in terms of the appearance of the image can be suppressed. Furthermore, since each pixel is assigned with a resolution identifier in the image data for transfer, in expansion processing, discrimination of whether each pixel is included in a high-resolution block or a low-resolution block can be easily pedal med.

B. Second Embodiment

Figure 12:
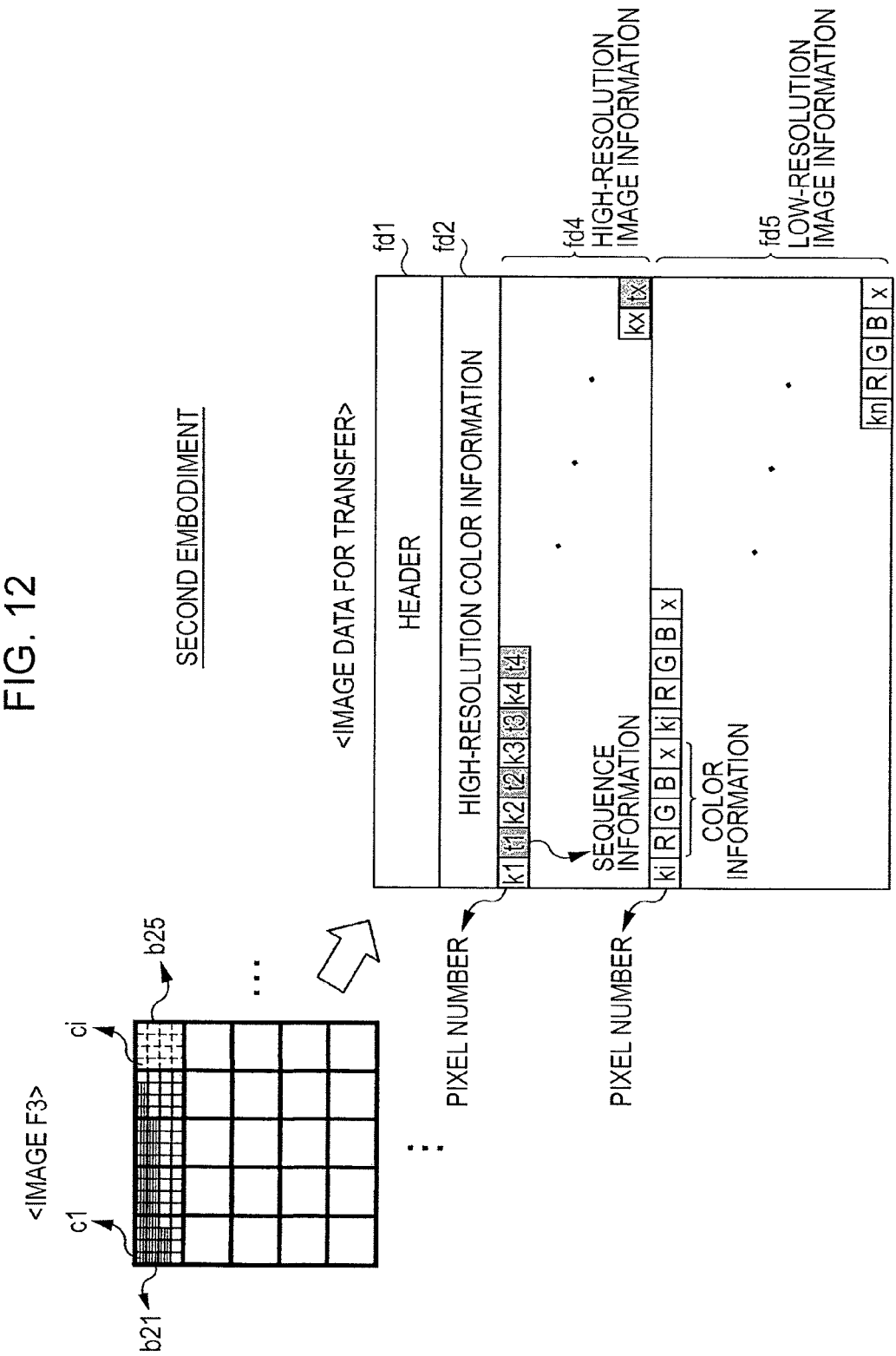
FIG. 12 is an explanatory diagram illustrating a data format of image data for transfer in a second embodiment.
Figure 13:
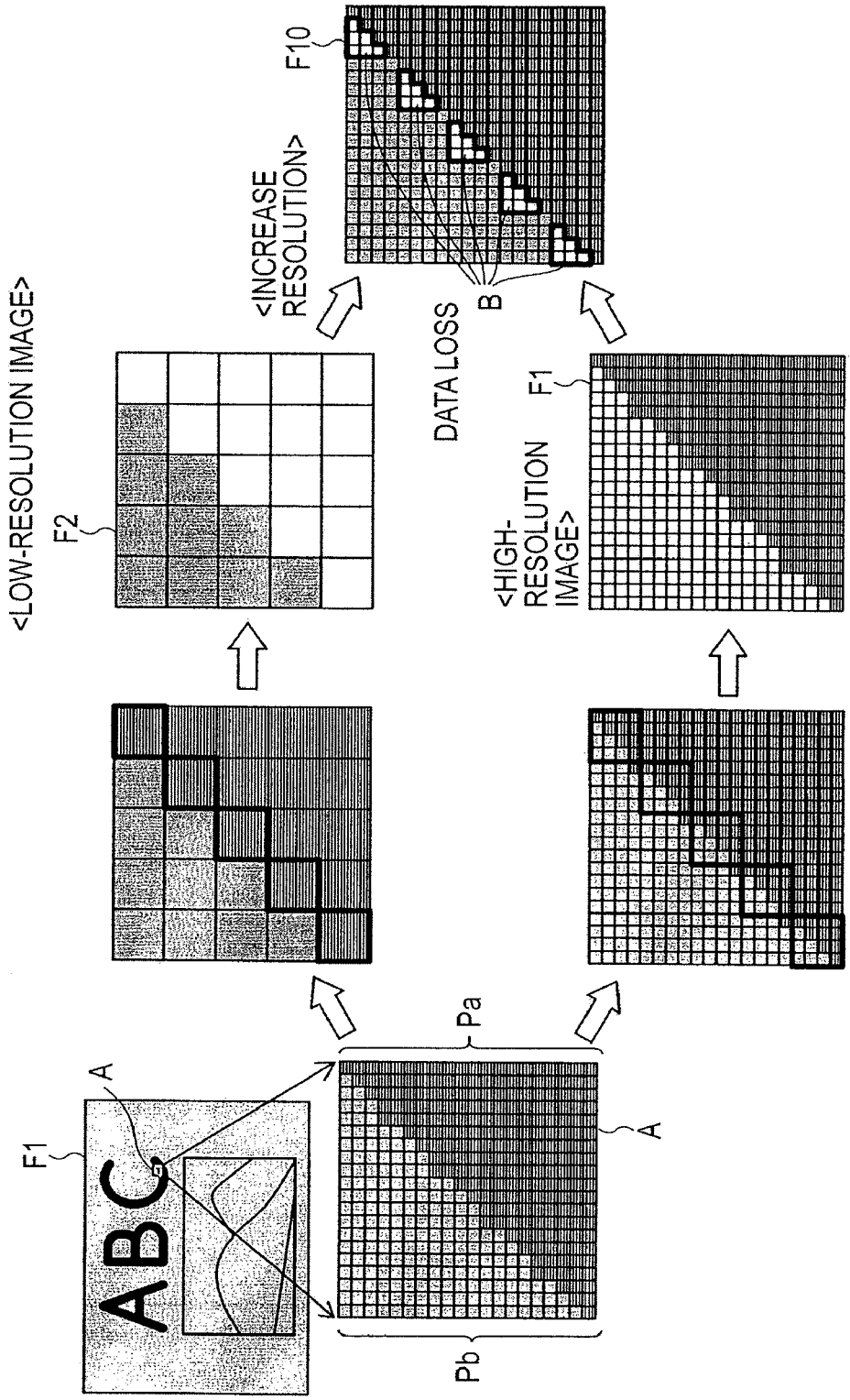
FIG. 13 is an explanatory diagram schematically illustrating an image-transferring method of the related art.

FIG. 12 is an explanatory diagram illustrating a data format of image data for transfer in a second embodiment. In the lower right part of FIG. 12, image data for transfer is illustrated that has been created on the basis of an image F3 illustrated in the upper left part of FIG. 12. The image-transferring system of the second embodiment is the same as the image-transferring system 500 (FIG. 1), with the exception of the data format of image data for transfer, which is different.

In contrast to the recording of a resolution identifier (0/1) for each pixel in the image data for transfer in the above-described first embodiment (FIG. 8), in the image data for transfer in the second embodiment (FIG. 12), a pixel number is assigned to each pixel instead of the resolution identifier. Furthermore, instead of the image information field fd3, the image data for transfer in the second embodiment includes an image information field for each resolution.

More specifically, the image data for transfer in the second embodiment includes a high-resolution image information field fd4 and a low-resolution image information fd5 in addition to the above-described header field fd1 and the high-resolution color information field fd2. A pixel number and a sequence number are recorded in the high-resolution image information field fd4, for each pixel included in a block determined to be inhomogenous. Here, the "pixel number" recorded in the high-resolution image information field fd4 is a pixel number of a pixel of a high-resolution image before compression. In the example illustrated in FIG. 12, a block b21 in the upper left corner of the image F3 is determined to be inhomogenous and a pixel number k1 indicating "first" and sequence information t1 indicating "first" are recorded at the front of the high-resolution image information field fd4 for a pixel c1 in the upper left corner of the block b21. The "sequence information" is the same as the sequence information in the first embodiment and color information (R, G, B, x) of the pixel c1 is recorded at the front (first position) of the high-resolution color information field fd2.

A pixel number and color information (R, G, B, x) are recorded in the low-resolution image information field fd5 for a block that has been determined to be homogenous. Here, the "pixel number" recorded in the low-resolution image information field fd5 is a pixel number that represents a corresponding block of a high-resolution image before compression. The pixel number of the pixel in the upper left corner of each block can be adopted as this pixel number, for example. In the example illustrated in FIG. 12, a block b25 is determined to be homogenous and a pixel number ki and color information (R, G, B, x) of the pixel ci in the upper left corner of the block b25 are recorded at the front of the low-resolution image information field fd5.

Here, a pixel number kx and a sequence number tx are recorded at the end of the high-resolution image information field fd4. The pixel number kx cannot exist for a high-resolution image before compression and the sequence number tx cannot exist for a high-resolution image before compression. The pixel number kx and the sequence number tx are inserted to indicate the boundary of the high-resolution image information field fd4 and the low-resolution image information field fd5.

On the multifunction apparatus 100 side, upon receiving image data for transfer having such a format, the image-data-expanding unit 12b increases the resolution of (expands) the image data on the basis of color pixels recorded in the low-resolution image information field fd5. At this time, since a pixel number is recorded in association with each piece of color information, whether or not a pixel that was obtained by expansion is to be simply recorded for pixels of all the pixel numbers can be determined.

The image-transferring system of the above-described second embodiment provides the same effect as the image-transferring system 500 of the first embodiment.

C. Modifications

Embodiments of the invention are not limited to the above described embodiments and can be applied in a variety of situations within the scope of the invention provided it does not depart from the gist thereof and, for example, the following modifications can be made.

C1. First Modification

In each of the above-described embodiments, the amount of data is reduced by performing image-data-for-transfer creating processing for image data to be transferred from the personal computer 200 to the multifunction apparatus 100, but embodiments of the invention are not limited to this. For example, the amount of data can be reduced by converting (compressing) data into the above-described image data for transfer at the time of transferring an image read out by the reading unit 14 of the multifunction apparatus 100 to the personal computer 200. In this case, a configuration is adopted in which a functional unit that is the same as the image-data-for-transfer creating unit 223 is included in the multifunction apparatus 100. Furthermore, not limited to data to be transferred between the multifunction apparatus 100 and the personal computer 200, the image-data-for-transfer creating processing can be performed for image data to be transferred between other arbitrary apparatuses. For example, the image-data-for-transfer-creating processing can be performed for data to be transferred between the personal computer 200 and another personal computer, which is not illustrated. In addition, for example, for a configuration in which the personal computer 200 is provided with an external storage device, which is not illustrated, the image-data-for-transfer-creating processing of an embodiment of the invention can also be performed for data to be transferred between the personal computer 200 and the external storage device.

Furthermore, the image-data-for-transfer-creating processing can also be performed for data to be transferred within a single apparatus instead of for data to be transferred between two apparatuses. For example, in the multifunction apparatus 100, in the case of transmitting an image that has been read out by the reading unit 14 to the display unit 16, the image-data-for-transfer-creating processing can also be performed for data to be transferred between the reading unit 14 and the display unit 16. In addition, for example, for a configuration in which the multifunction apparatus 100 includes a FAX unit, which is not illustrated, in the case of transmitting a facsimile of an image that has been read out by the reading unit 14, the image-data-for-transfer-creating processing can also be performed for data to be transferred between the reading unit 14 and the FAX unit. In other words, generally, the image-data-for-transfer creating processing of an embodiment of the invention can be performed for data to transferred between a data-transmitting apparatus and a data-receiving apparatus.

C2. Second Modification

In each of the above-described embodiments, in the image data for transfer, the resolution of a block that has been determined to be homogenous is reduced to 600 dpi×600 dpi (height×width), but the resolution can be reduced to any arbitrary resolution. For example, the resolution in a standard printing mode can be set to 1200 dpi×1200 dpi and a homogenous pixel (block) can be reduced to this resolution. In such a case, the determination block can be set to be two pixels× two pixels.

In addition, a configuration can be adopted in which a user arbitrarily sets the post-reduction resolution. More specifically, for example, in the printing-mode setting area Ar1 in the printer-driver setting screen W1 (FIG. 3), instead of the two levels "standard image quality" and "high image quality", any of a plurality of levels can be selected and the post-reduction resolution (after compression) and the determination block can be set in accordance with the selected level. At this time, in the case where a higher image quality has been selected, the post-reduction resolution is set so as to be higher. By adopting such a configuration, the amount of data to be transferred can be reduced to an appropriate amount in accordance with the processing loads of the multifunction apparatus 100 and the network.

In addition, the resolution used for the image data for transfer has been described as being a resolution (600 dpi× 600 dpi or 2400 dpi×2400 dpi) that corresponds to a printing mode (FIG. 3), but a resolution that does not correspond to a printing mode (for example, 800 dpi×800 dpi) can be used instead.

Furthermore, in the above-described embodiments, two resolutions, namely, a high resolution (2400 dpi×2400 dpi) and a low resolution (600 dpi×600 dpi) are used together in the image data for transfer, but, not limited to two resolutions, an arbitrary number of resolutions can be used together. For example, a high resolution (2400 dpi×2400 dpi), an intermediate resolution (1200 dpi×1200 dpi) and a low resolution (600 dpi×600 dpi) can be used together. In such a case, for example, a configuration in which the homogeneity-determining processing is performed twice for different standards as described below can be implemented. First, a determination block is set to be four pixels×four pixels and then the homogeneity-determining processing is performed as first homogeneity-determining processing. As a result, blocks (pixels) that have been determined to be homogenous are made to be of the low resolution (600 dpi×600 dpi). Next, blocks that were determined to be inhomogenous in the first homogeneity-determining processing are made to be targets and the homogeneity-determining processing is performed again as second homogeneity-determining processing. At this time, the determination block is set to be two pixels×two pixels and then the homogeneity-determining processing is performed. As a result, blocks (pixels) that have been determined to be homogenous are made to be of the intermediate resolution (1200 dpi×1200 dpi) and blocks (pixels) that have been determined to be inhomogenous are maintained at the high resolution (2400 dpi×2400 dpi).

In addition, a configuration can also be adopted that automatically sets the post-reduction resolution and the size of the determination block in accordance with the processing loads of the multifunction apparatus 100 and the network (for example, in accordance with the usage rates of the memory 11 and the CPU 12 in the multifunction apparatus 100). For example, the personal computer 200 can be periodically informed of the usage rates of the memory 11 and the CPU 12 of the multifunction apparatus 100 and, in the personal computer 200, the post-reduction resolution and the size of the determination block can be set in accordance with the processing loads of the memory 11 and the CPU 12. In such a case, for example, when the usage rates of the memory 11 and the CPU 12 are high, the size of the determination block is set to be large so as to reduce the amount of data to a greater extent and the post-reduction resolution is set to be lower. In such a case, a configuration is adopted such that the personal computer 200 informs the multifunction apparatus 100 of the set post-reduction resolution and the set size of the determination block.

C3: Third Modification

In each of the above-described embodiments, in the homogeneity-determining processing (FIG. 6), in the case where the difference between the target pixel and each of the other pixels is zero ("NO" in step S220), it is determined whether or not calculation of the differences between all of the pixels is complete; however, this determination processing (step S220) can be omitted. In other words, in the case where the difference between the target pixel and each of the other pixels is zero, the block can be determined to be homogenous (step S225). By doing this, the duration of the homogeneity-determining processing can be shortened.

C4. Fourth Modification

In each of the above-described embodiments, in the homogeneity-determining processing, it is determined whether or not the determination block is homogenous on the basis of whether or not any differences in color information between pixels are greater than zero; however, embodiments of the invention are not limited to this. For example, it can be determined whether or not the determination block is homogenous on the basis of whether or not the number of differences between individual pixels that are greater than zero, is greater than a threshold value. In such a case, when the number of differences that are greater than zero is greater than the threshold value, the block is determined to be inhomogenous and when the number of differences is less than or equal to the threshold value, the block is determined to be homogenous. Furthermore, for example, the determination can be performed on the basis of whether or not an accumulated value of differences between individual pixels is greater than a threshold value. In other words, generally, an arbitrary method that can be used to determine whether or not the determination block is homogenous can be adopted in the image-transferring system of an embodiment of the invention. In addition, in each of the above-described embodiments, a difference between pixels was described as being a value obtained by adding together the absolute values of differences between respective colors of color information (R, G, B); however, embodiments of the invention are not limited to this. For example, for a monochrome image, a difference with respect to any of the colors of the color information (R, G, B) can be adopted as the difference between pixels. In such a case, since the difference can take a negative value, in the determination of whether or not the determination block is homogenous, when the difference is zero, the block is determined to be homogenous and when the difference is not zero, the block is determined to be inhomogenous.

C5. Fifth Modification

In each of the above-described embodiments, the PDL-developing unit 221 and the vector-developing unit 222 can be omitted. For example, in a configuration in which the application-executing unit 21 creates raster image data, the PDL-developing unit 221 and the vector-developing unit 222 can be omitted. In other words, the image-data-for-transfer creating unit 223 can adopt an arbitrary configuration that is capable of obtaining raster image data.

C6. Sixth Modification

In each of the above-described embodiments, for a block that has been determined to be inhomogenous, color information (R, G, B, x) has been described as not being recorded in the image information field fd3 and the high-resolution image information field fd4, but rather in the high-resolution color information field fd2. However, instead of this, similar to the case for a block that has been determined to be homogenous, the image-data-for-transfer creating unit 223 can record the color information (R, G, B, x) in the image information field fd3 and the high-resolution image information field fd4. More specifically, for example, color information (R, G, B, x) of a block that has been determined to be homogenous and color information (R, G, B, x) of a block that has been determined to be inhomogenous are both recorded in the image information field fd3 in the order of the pixel numbers in the high-resolution image before compression. At this time, for a block that has been determined to be homogenous, together with recording one piece of color information (R, G, B, x), the number of pixels that are covered by this one piece of color information is preferably recorded as attached information. In this configuration, in the case where a plurality of blocks have been successively determined to be homogenous, the number of pixels that constitute the plurality of blocks can be recorded as attached information. Therefore, information on a plurality of blocks can be recorded by using one piece of color information and the amount of data to be transferred can be reduced.

In addition, in each of the above described embodiments, information to be recorded in the high-resolution color information field fd2 has been described as being color information of all pixels within a block determined to be inhomogenous; however, instead of this, colors existing in a block determined to be inhomogenous can be represented by information in the form of a table. More specifically, for example, for two pixels having the same color information and being included in a block that has been determined to be inhomogenous, color information of one of the pixels is recorded (registered) in the high-resolution color information field fd2 as one record of a color table. For the other pixel, color information is not recorded (registered) in the high-resolution color information field fd2, but instead sequence information for the color information (record) of the one pixel that has already been recorded, is recorded in the image information field fd3. By doing this, the amount of data for a block that has been determined to be inhomogenous can be reduced.

C7. Seventh Modification

In each of the above-described embodiments, an area five blocks×five blocks constituting an area A1 has been described as an example; however, the unit of processing used when performing the individual processing operations (image-data-for-transfer creating processing, data transmission processing and data reception processing) is not limited to a five block×five block area. The entirety of the image can be used as the unit of processing. Furthermore, each of the processing operations can also be performed using units of lines or bands. Still furthermore, in the case where the image is a document that extends over a plurality of pages, the individual processing operations can also be performed in units of single pages.

C8. Eighth Modification

In the each of the above-described embodiments, part of the configuration described as being implemented using hardware may be instead implemented with software, or conversely part of the configuration described as being implemented using software may instead be implemented with hardware.

The entire disclosure of Japanese Patent Application No. 2008-332793, filed Dec. 26, 2008 and 2009-207790, filed Sep. 9, 2009 are expressly incorporated by reference herein.

What is claimed is:

1. A printing system that transfers an image composed of pixels of a first resolution, comprising:
   a client; and a printing apparatus;
   wherein the client includes
   a determining unit that, for a pixel block that is of a size of a pixel of a second resolution that is lower than the first resolution, determines whether or not the pixel block is homogenous on the basis of a difference in color information for a target pixel of the first resolution included in the pixel block;
   an image-data-for-transfer creating unit that creates image data for transfer by changing pixels of the first resolution included in a pixel block that has been determined to be homogenous from the first resolution to the second resolution, and by maintaining pixels at the first resolution in a pixel block that has been determined to be inhomogeneous; and
   a transmitting unit that transmits the image data for transfer; and
   wherein the printing apparatus includes
   a receiving unit that receives the image data for transfer; and
   a high-resolution-image-data creating unit that creates image data representing an image composed of pixels of the first resolution by changing pixels of the second resolution in the image data for transfer from the second resolution to the first resolution.

2. The printing system according to claim 1, wherein, excluding a case where all blocks included in the image are determined to be homogenous by the determining unit and a case where all blocks included in the image are determined to be inhomogenous by the determining unit, the image data for transfer includes color information of pixels of the first resolution and color information of pixels of the second resolution.

3. The printing system according to claim 1, wherein the image-data-for-transfer creating unit creates the image data for transfer by arranging the color information of individual pixels in an order determined by the determining unit regardless of the presence or absence of a change from the first resolution to the second resolution.

4. The printing system according to claim 1, wherein in a case where the difference in color information is zero, the determining unit determines that the pixel block is homogenous.

5. The printing system according to claim 1, wherein the high-resolution image data creating unit, when changing a pixel of the second resolution from the second resolution to the first resolution, sets pixel values of color information of the pixels of the first resolution included in the pixel block of a size a pixel of the second resolution to the same value.

6. The printing system according to claim 1, wherein the image data for transfer includes an identifier that identifies a pixel of the first resolution or a pixel of the second resolution.

7. A printing apparatus that internally transfers an image composed of pixels of a first resolution, comprising:
   a determining unit that, for a pixel block that is of a size of a pixel of a second resolution that is lower than the first resolution, determines whether or not the pixel block is homogenous on the basis of a difference in color information for a target pixel of the first resolution included in the pixel block;
   an image-data-for-transfer-creating unit that creates image data for transfer by changing pixels of the first resolution included in a pixel block that has been determined to be homogenous from the first resolution to the second resolution, and by maintaining pixels at the first resolution in a pixel block that has been determined to be inhomogeneous;
   a transmitting unit that transmits the image data for transfer;
   a receiving unit that receives the transmitted image data for transfer; and
   a high-resolution-image-data creating unit that creates image data representing an image composed of pixels of the first resolution by changing pixels of the second resolution in the received image data for transfer from the second resolution to the first resolution.

8. An image-printing method for transferring an image composed of pixels of a first resolution from a client to a printing apparatus and printing the image, the image-printing method comprising:
   (a) determining, in the client, for a pixel block that is of a size of a pixel of a second resolution that is lower than the first resolution, whether or not the pixel block is homogenous on the basis of a difference in color information for a target pixel of the first resolution included in the pixel block;
   (b) creating, in the client, image data for transfer by changing pixels of the first resolution included in a pixel block that has been determined to be homogenous in (a) from the first resolution to the second resolution, and by maintaining pixels at the first resolution in a pixel block that has been determined to be not homogeneous in (a);
   (c) transmitting, in the client, the image data for transfer;
   (d) receiving, in the printing apparatus, the image data for transfer;
   (e) creating, in the printing apparatus, image data representing an image composed of pixels of the first resolution by changing pixels of the second resolution in the image data for transfer from the second resolution to the first resolution; and
   (f) performing printing, in the printing apparatus, on the basis of the image data created in (e).

* * * * *